United States Patent [19]

Kawana

[11] Patent Number: 4,855,158
[45] Date of Patent: * Aug. 8, 1989

[54] CRUSTACEAN FORMING PROCESS AND APPARATUS

[75] Inventor: Frank S. Kawana, Pasadena, Calif.

[73] Assignee: JAC Creative Foods, Inc., Los Angeles, Calif.

[ * ] Notice: The portion of the term of this patent subsequent to Jan. 19, 2005 has been disclaimed.

[21] Appl. No.: 106,666

[22] Filed: Oct. 13, 1987

Related U.S. Application Data

[62] Division of Ser. No. 818,774, Jan. 14, 1986, Pat. No. 4,720,391.

[51] Int. Cl.⁴ .................... A22C 25/00; A22C 29/02
[52] U.S. Cl. .................................. 426/643; 426/513; 426/573; 426/574
[58] Field of Search ............... 426/643, 513, 573, 574

[56] References Cited

U.S. PATENT DOCUMENTS

| | | |
|---|---|---|
| 3,358,588 | 12/1967 | Rossnan . |
| 4,285,980 | 8/1981 | Lewis . |
| 4,396,634 | 8/1983 | Shenouda et al. ............ 426/643 X |
| 4,497,844 | 2/1985 | Hice et al. ............... 426/643 |
| 4,559,236 | 12/1985 | Okada ..................... 426/643 |
| 4,579,741 | 4/1986 | Hanson et al. ............ 426/643 X |
| 4,584,204 | 4/1986 | Nishimura et al. . |
| 4,588,601 | 5/1986 | Maruyama et al. ......... 426/643 X |
| 4,622,234 | 11/1986 | Okada ..................... 426/643 |
| 4,720,391 | 1/1988 | Kawana ................... 426/643 X |

Primary Examiner—Joseph Golian
Attorney, Agent, or Firm—William W. Haefliger

[57] ABSTRACT

A fish product is produced by heating, in a mold cavity, a mixture of fish paste and pieces of gelled fish paste, the cavity being vented to the exterior allows the mix to expand via the vent during such heating, to produce a simulated crustacean form. The gelled pieces may be acid treated prior to mixing with fish paste, and the molded product further processed, so that the final product has a simulated crustacean bite texture.

3 Claims, 4 Drawing Sheets

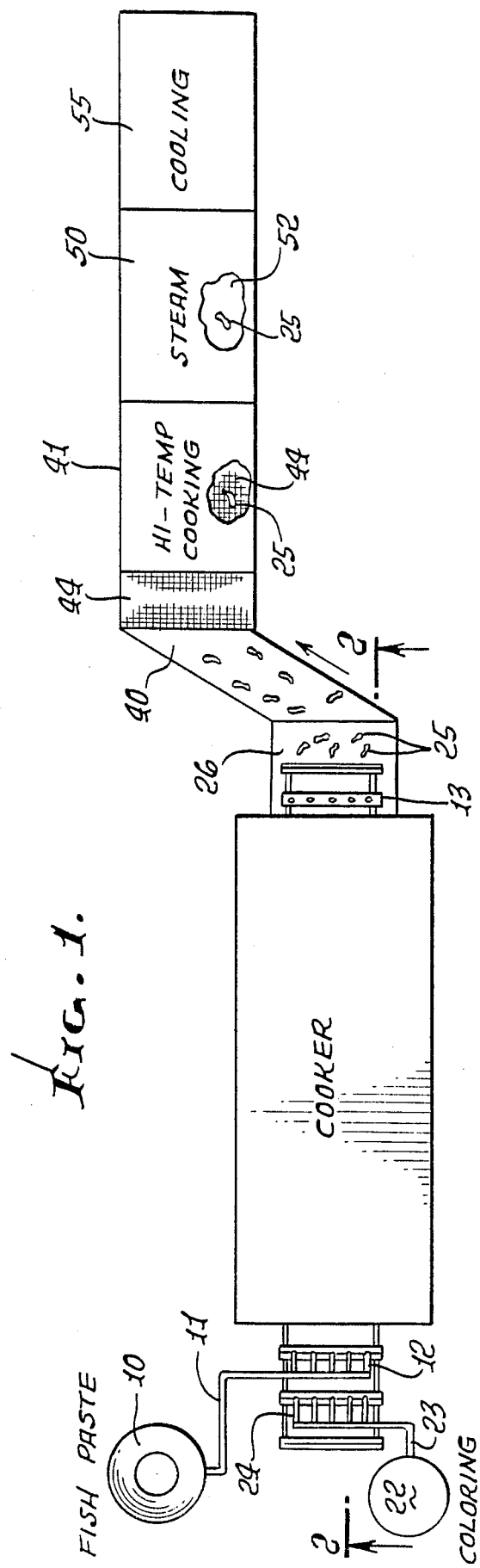

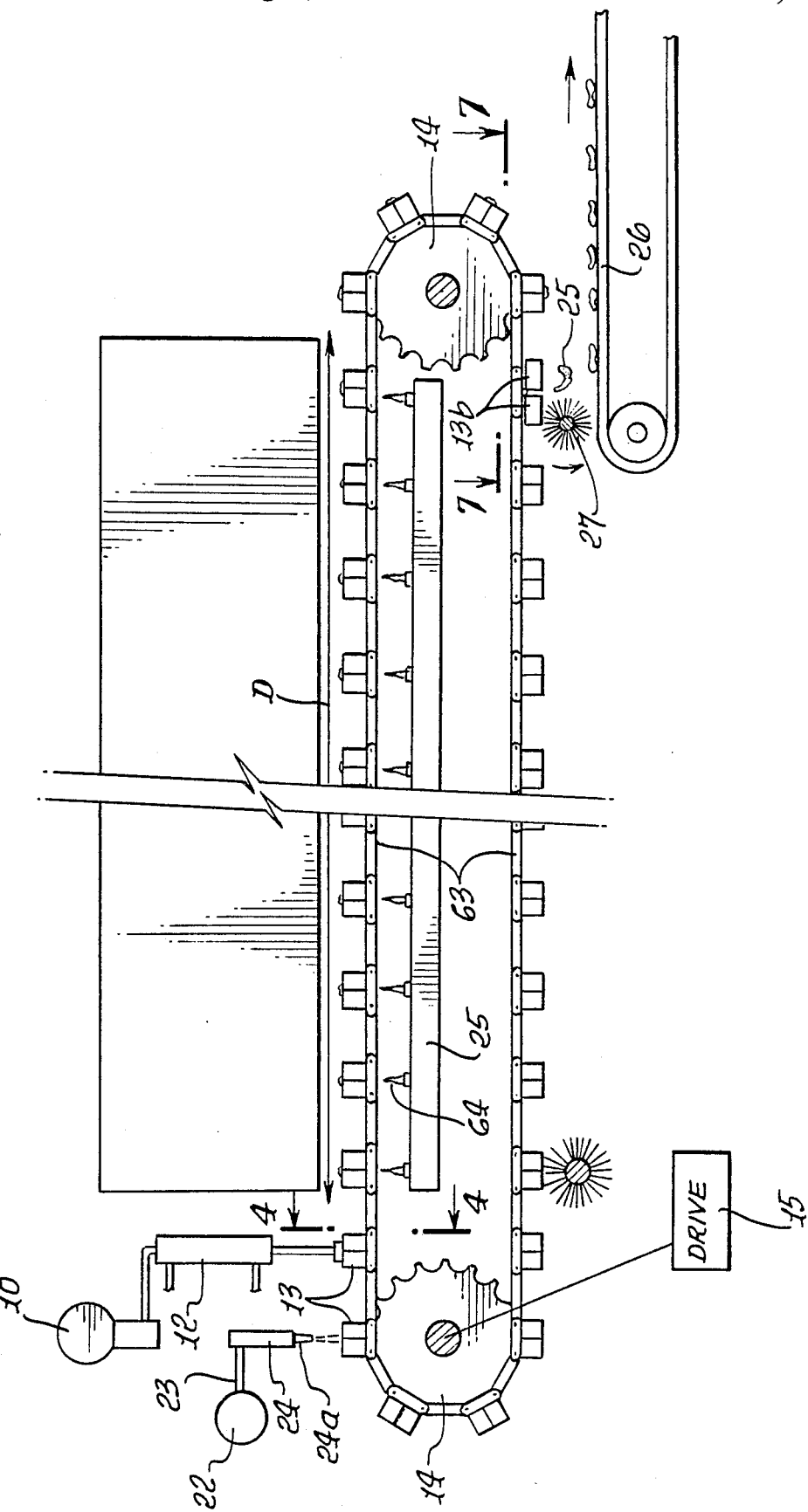

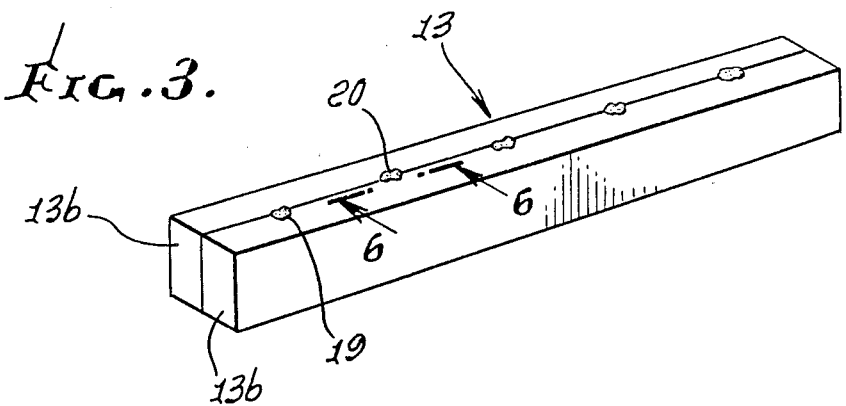
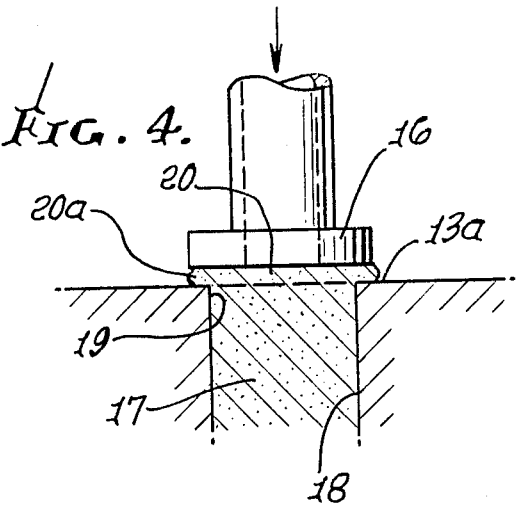
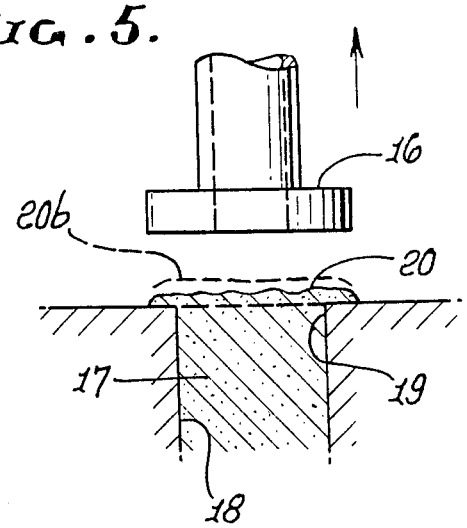
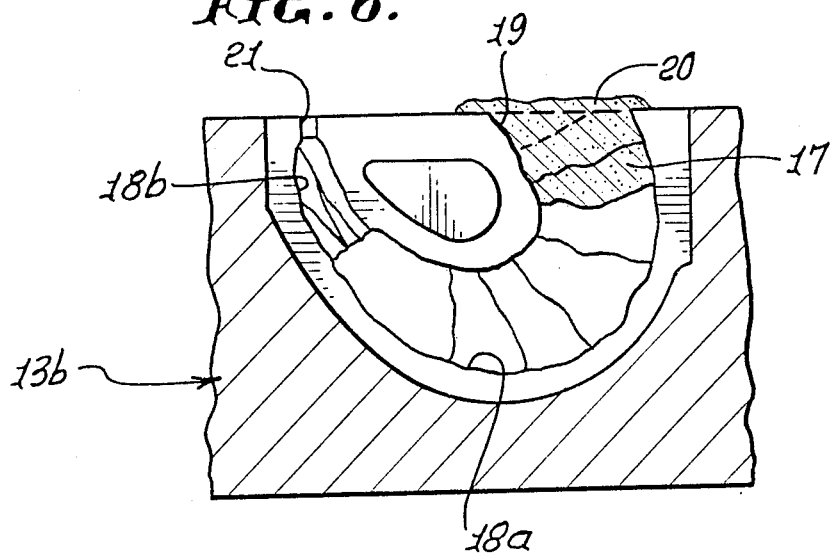

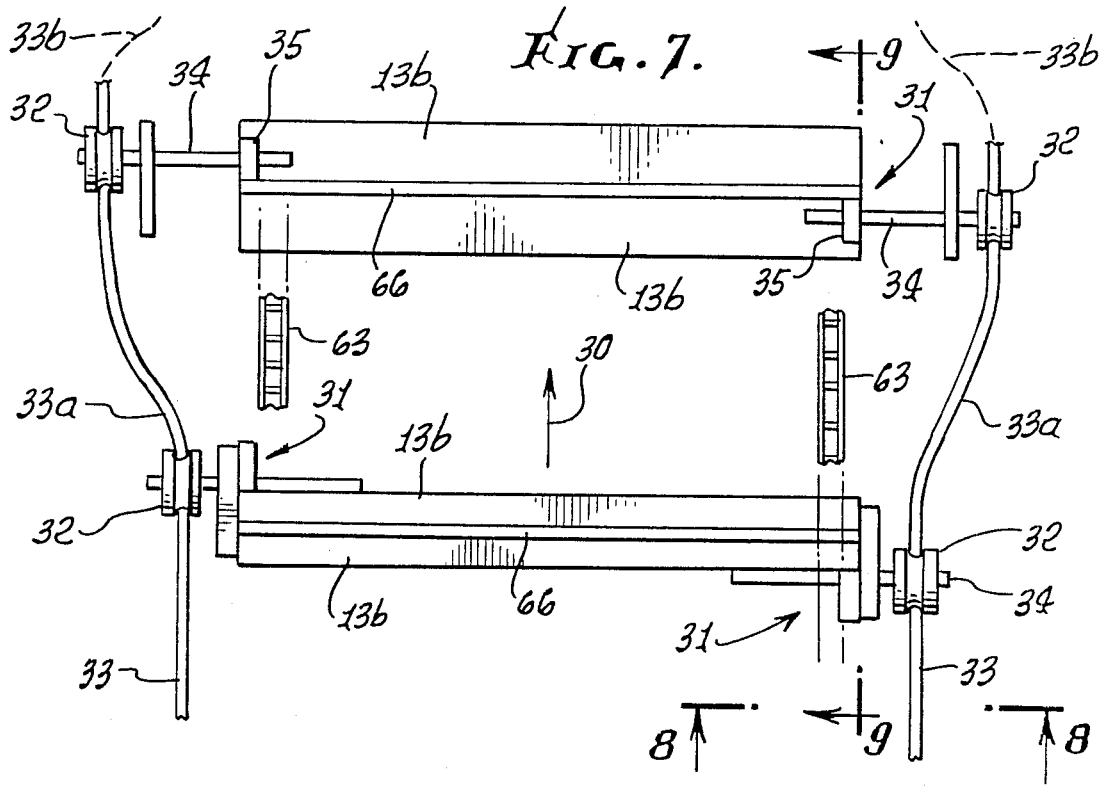
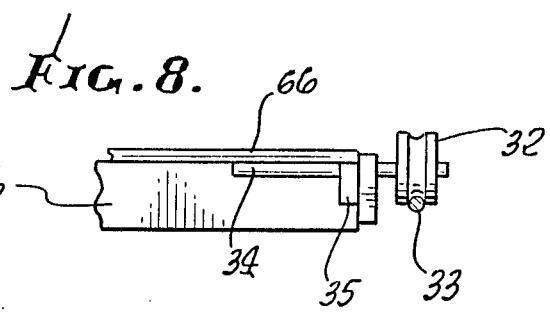
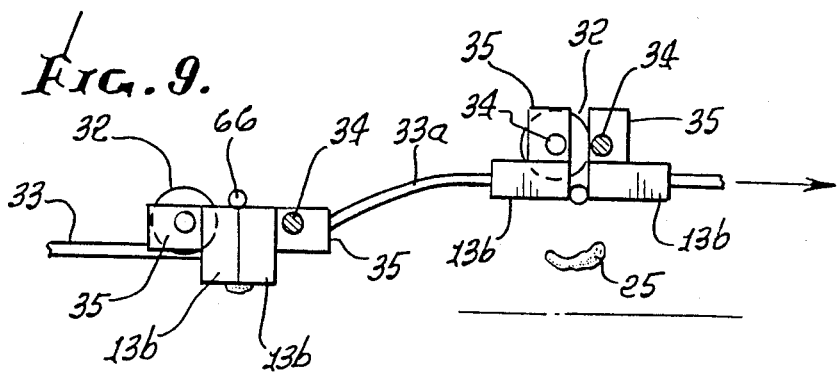

4,855,158

CRUSTACEAN FORMING PROCESS AND APPARATUS

This application is a division of Ser. No. 818,774 filed Jan. 14, 1986, now U.S. Pat. No. 4,720,391.

BACKGROUND OF THE INVENTION

This invention relates generally to a unique seafood product, one example being a crustacean product similar to shrimp, and to a process for making that product from comminuted fish meat.

The process of mechanically deboning of fish meat has received increasing attention during the last twenty years throughout the world in order to utilize efficiently nutritious proteinaceous resources, such as numerous underutilized marine species. Many efforts have been made recently to produce less expensive, more attractive, more acceptable fabricated products for human consumption from mechanically deboned fish meat.

In U.S. Pat. No. 4,303,008, there is disclosed a process for producing a restructured food product from fish meat paste; however, that process is complex, and requires elevated pressurization of the paste in a mold during cooking.

There is need for a simple, reliable process to produce a fish paste crustacean product such as a shrimp as well as other similar products, without requiring pressurization of the product in the mold; and there is need for a process as disclosed herein, and which produces a superior product simulating the shape of a shrimp body, the head of which has been separated from the body, as by manual pull. Such shrimp-like products desirably have random or orientations of neck strands. Also, there is need for process producing a shrimp or lobster product which is juicy and tender, the meat of which is not undesirably compressed, and which has the texture and shape of the crustacean, part of which has been separated by pull-off from the body or remainer of the crustacean.

SUMMARY OF THE INVENTION

It is a major object of the invention to provide an improved process, and product thereof, and which meets the above needs. Basically, the process includes the steps:

(a) comminuting fish meat to form both fish paste, and also forming pieces of shredded, gelled fish paste, and combining said paste and pieces for forming a mix, (b) providing heated mold sections which are closable to form a cavity which is vented to the exterior via a vent, and which are openable to provide access to said cavity, (c) injecting the mix into said cavity, to substantially fill same, (d) further heating the molds to at least partially cook the mix in the cavity, to expand a portion of the mix at said vent, and to set the mix, whereby a formed product is produced, (e) and opening the mold and recovering the formed product, for further processing.

As will appear, the heating step is typically carried out to cause mix expansion from the vent, forming an uneven terminus that simulates the neck terminus of a shrimp after pull-off removal of the shrimp head. In this regard, the injection step may be carried out to leave some of the mix overhanging the exterior of the mold adjacent said vent.

A series of molds may be provided, and the step (d) heating may advantageously be carried out by traveling the molds in sequence past an exterior radiant heat source, such as flame producing burners, and to a zone wherein the molds are sequentially opened and inverted while traveling, for gravitational discharge of the crustacean "headless" products. Such travel and mold opening facilitates subsequent rotary brush assisted removal of the products from the downward facing and exposed cavities of the opened molds, and subsequent brush cleaning of the re-closed molds at their surfaces adjacent the vents, so that subsequent filling of the molds and vents, and expansion of the meat at and externally of the vents, can occur to produce the products.

In addition, further processing typically comprises broiling the formed product for between 50 and 70 seconds, and at a broiling zone wherein the temperature is between 160° C. and 200° C.; and subsequent cooking in a steam containing zone, to impart juiciness to the bodies of the non-compressed crusteacean like products, under time and temperature conditions as will appear. The use in the process of a mix of both fish paste and pieces of shredded, gelled fish paste assures that the final product textures will closely simulate that of an actual shrimp.

These and other objects and advantages of the invention, as well as the details of an illustrative embodiment, will be more fully understood from the following specification and drawings, in which:

DRAWING DESCRIPTION

FIG. 1 is a plan view of apparatus used in carrying out the process;

FIG. 2 is an enlarged side elevation on lines 2—2 of FIG. 1;

FIG. 3 is a perspective view of a closed mold, with fish paste in the mold cavities;

FIG. 4 is an enlarged section on lines 4—4 of FIG. 2, and showing fish paste injection into a mold cavity;

FIG. 5 is a view like FIG. 4, and showing a raised fish paste injection;

FIG. 6 is an enlarged view taken on lines 6—6 of FIG. 3;

FIG. 7 is an enlarged plan view taken on lines 7—7 of FIG. 2;

FIG. 8 is a fragmentary section on lines 8—8 of FIG. 7; and

FIG. 9 is a fragmentary section on lines 9—9 of FIG. 7.

DETAILED DESCRIPTION

In FIGS. 1 and 2, comminuted fish is supplied at 10 to be treated in equipment to be described. Regarding such supply, and in one example of the process, for forming a crustacean-like product such as shrimp, frozen blocks of surimi (washed minced fish) are tempered at room temperature until partially thawed. Blocks of tempered surimi are then put into a grinder and ground. Some hot water (at about 70° C.) is added to the surimi in the grinder to raise the temperature of the mix, for example to about −1.0° C. Salt is then added to the formulation. After grinding for about 2 minutes, with temperature increased to about 3° C., more salt is added and grinding continued for 6 more minutes. Shrimp flavoring is added, and grinding continued for another 6 minutes. The temperature of the finished paste is then around 8° C. The paste is then separated into two portions.

One such portion of the finished paste is spread on rectangular pans, and allowed to set at about 8° C. for 20 hours, during which the paste physically transforms into an elastic gel.

After setting, the surimi gel is transformed to a steam cooker, and cooked at about 90° C. for about 80 minutes. The cooked gel is then shredded into small pieces, i.e. elongated pieces between 30 and 70 millimeters in length; 5 to 15 millimeters in width; and 0.5 to 1.0 millimeters in thickness. Three percent (by weight) of citric acid is added to the shredded gel, and the mix is allowed to soak for 15 minutes. The citric acid concentration is 10%. Acid is then pressed from the shredded gel, which is then combined with the second portion of flavored surimi paste, and the mix transferred to a shrimp forming machine to be described. The ratio of shredded gel to flavored surimi paste is about 35:65.

The fish slurry (such as a mix of fish paste and pieces of shredded gelled fish paste), is supplied at 11 to injectors 12 for injecting the mix into heated molds 13. A series sequence of such molds is shown as provided on an endless chain conveyor 63 entrained about sprockets 14. The conveyor is driven at 15 so that the travel of each mold is interupted while the mold cavity or cavities are filled with the mix via the injector or injectors 12. See for example FIG. 4 showing an injector nozzle 16 in down position and discharging mix at 17 into a mold cavity 18. As the injector is lifted, some of the mix is allowed to protrude from the mold vent 19, as indicated at 20, and typically overhangs at 20a the mold exterior surface 13a adjacent the vent. FIG. 3 shows a typical mold 13 to include the elongated and like mold sections 13b, which form multiple cavities 18 and vents 19, when the sections are closed together. FIG. 6 shows the shrimp-shaped configuration of one half of the mold cavity, formed by one section 13b. Note approximately C-shaped cavity region 18a corresponding to the shrimp body, narrowed region 18b corresponding to the shrimp tail, and vent region 19 corresponding to the shrimp neck. A cavity air vent is formed at 21. The cavity 18 may alternatively have lobster, or other crustacean shape.

Prior to injecting the mix into the mold cavities, a suitable colorant may be sprayed or otherwise transferred into the mold section cavities and onto the cavity surfaces. Such colorant may be water soluble, and conveyed from a tank source 22, and via a line 23, to injectors 24. The injectors may be lowered so that their nozzle ends 24a penetrate the mold vents 19, to spray colorant in water into the cavities. A suitable cavity lubricant, or release composition, may also be conveyed in the spray, to coat cavity surfaces.

As the filled and heated molds are transported to the right, in FIG. 2, they are further heated exteriorly as by gas flames 64 rising from gas burner 25, or other heat source means. Combustible fuel heating is preferred due to simplicity of equipment and temperature control. Such heating is typically continued while the mold travels distance D over the flames, and for between 60 and 100 seconds, and optimally for about 72 seconds, and at a temperature or temperatures to cook the mix, causing it to cohere and form a unitary, soft product, discharged at 25 onto a second conveyor 26. The product temperature upon such discharge is between 60° and 75° C. and preferably at least about 65° C.

Note that the vents 19 are directed upwardly, away from and out of the path of the flames 24, so that the exposed mix outwardly of the vents 19 is not directly contacted by the flames. Further, such cooking causes expansion of the mix in the cavity, and its outward expansion or displacement (see broken lines 20b in FIG. 5) from and relative to vent 19, the portion thus protruding being randomly uneven in surface texture, to simulate the neck region of an actual shrimp after pull-off of the shrimp head. This is made possible due to the process described and to be described, and further characterized by an absence of pressurization of the mix in the continuously vented mold-cavity, during cooking in the mold.

FIGS. 2 and 7-9 also illustate mold opening, to downwardly expose the mold section cavities, for product fall-out, by gravity, onto conveyor 26. See for example the opened sections 13b in FIG. 2. A rotary brush 27 may be employed to brush against the underside of the molds to clean the cavities of any remanant cooked mix, and/or to assist in product discharge from the mold sections.

FIG. 7 shows the molds conveyed in direction 30, with slidable camming units 31 attached to the section 13b. The units 31 are activated in response to sideward displacement of rollers 32 traveling along rails 33, which diverge laterally at 33a. As rollers 32 are displaced laterally by the rails, cam unit slides 34 interact with followers 35 to pivot each mold section about 90°, one forwardly and the other rearwardly, to open the mold. Thereafter, the molds are closed as the rollers 32 travel along the rails that converge at regions 33b. See also mold section hinges 66.

Referring back to FIG. 1. product 25 on conveyor 26 is tranferred to and by another conveyor 40, to further processing equipment. Such further processing typically includes broiling the product at 41, for a time interval $t_1$ between 50 and 70 seconds, and at a broiling zone wherein the temperature is between 160° C. and 200° C. For best results, the product is broiled for about 64 seconds, and at a temperature or temperatures of about 180° C., the product temperature at the end of broiling being about 60° C. Such broiling is desirably carried out while the product is supported on a slowly traveling open-work metal grid that includes conveyor 44 in the broiling zone, and by combusting gas at upper and lower sides of the grid to directly transmit broiling heat to opposite sides of the product.

Subsequently, the product is cooked in an enclosed, steam filled zone 50 for a time interval $t_2$, between 9 and 11 minutes. Zone 50 is typically at atmospheric pressure, and the temperature therein is kept between 80° and 110° C., and preferably at about 85° C. for best results. The product may be traveled on a conveyor 52 in zone 50.

Finally, at the end of $t_2$, the product is transferred into a cooling zone 55, kept at a temperature around 0° C. The cooled product is then packed, for shipment.

In the above, the mold may be metallic, with coating surfaces formed by TEFLON to prevent product adherence. Due to the non-smooth configuration of the cavity surfaces having shrimp body shape, the sprayed-in reddish color will not coat the surfaces uniformly, so that the resultant color transferred to the product will impart a true shrimp surface look to the product.

The red color can be any standard FDA approved red color.

We claim:

1. In a process for forming a simulated crustacean product from fish, the steps that include:

(a') comminuting the fish to form a mass of fish paste, thereby to increase the surface area of the mass, said comminuting carried out by grinding the fish at between about −1.0° C. and 3° C., salt and shrimp flavoring are added to the mix, and said grinding is continued until the fish paste temperature increases to about 8° C., (b') spreading a first portion of said mass on a surface and allowing said first portion of the mass to gel, by allowing said first portion to set for about 20 hours, at about 8° C., (c') heating the gel in a steam zone, and then shredding the gel into pieces, (d') treating the gel pieces with a weak citric acid solution for about 15 minutes, and then separating the acid solution from the treated pieces, (e') combining the acid treated pieces of said first portion of the mass with a second portion of said mass which is in fish paste form, thereby to form a mix, (f') and thereafter forming the mix to simulated crustacean shape, and heating same to set the mix in the form of said crustacean product, said heating carried out in a mold cavity having a vent from which the mix is allowed to expand outwardly during said heating, thereby producing a displaced bulge displaced from the vent to simulate the uneven neck terminus of a shrimp after pull-off removal of the shrimp head, and recovering the shrimp shaped product from the mold cavity, (g') and including brushing mold exterior surfaces adjacent the vent prior to said injecting step to free said exterior surfaces of cooked fish paste.

2. The process of claim 1 wherein said (d') step is carried out by contacting the pieces with citric acid in a weight percent ratio of about 3% acid to about 97% pieces, acid soaking for about 15 minutes, the citric acid concentration being about 10%.

3. The process of claim 1 wherein said first and second portions of the mix combined pursuant to step (c') have a weight ratio of about 35:65.

* * * * *